Aug. 31, 1954  A. P. WATERSON  2,687,880
PIPE BEVELING APPARATUS
Filed Jan. 16, 1950  5 Sheets-Sheet 4

INVENTOR.
A. P. Waterson
BY
C. M. McKnight

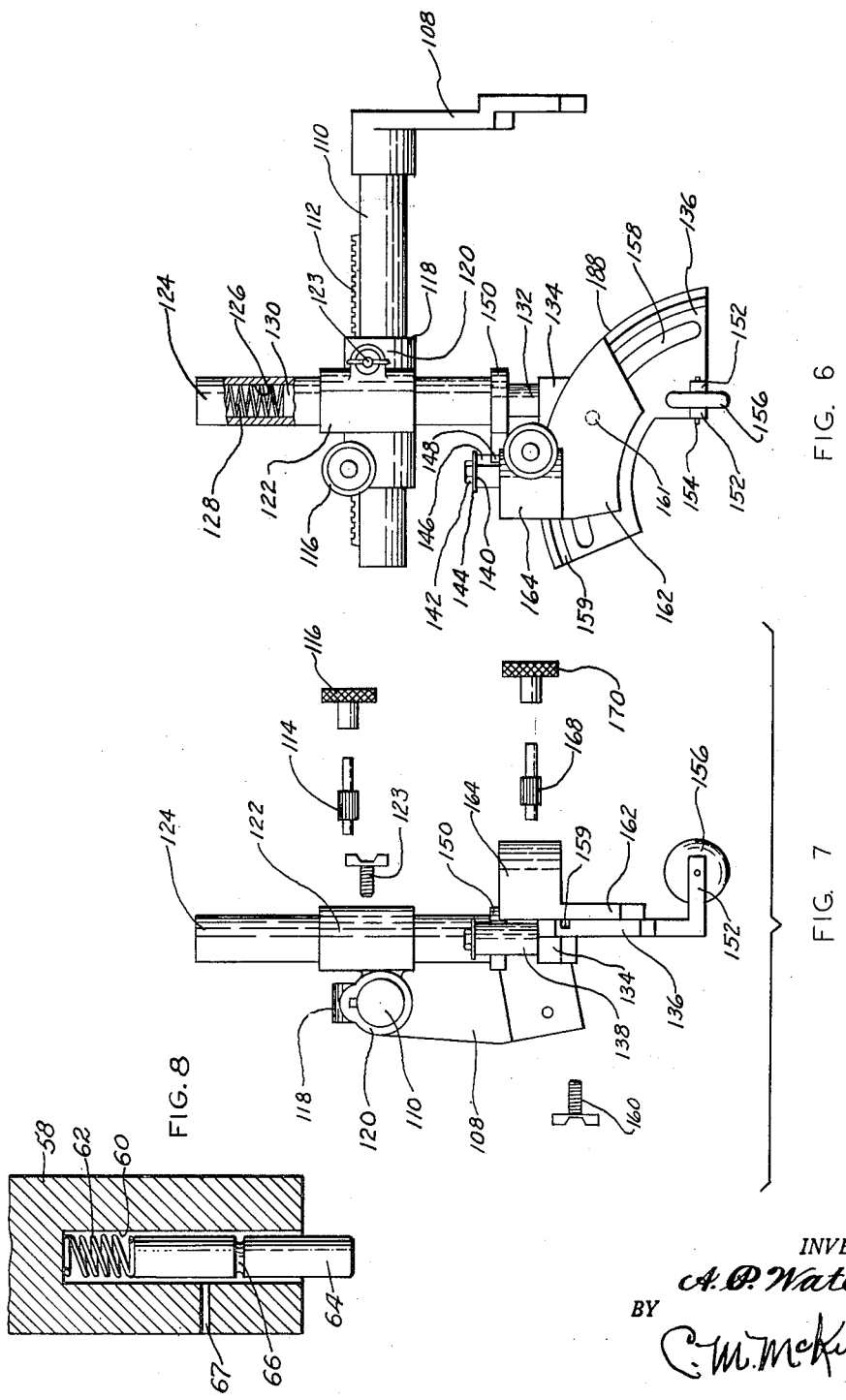

Patented Aug. 31, 1954

2,687,880

UNITED STATES PATENT OFFICE 2,687,880

PIPE BEVELING APPARATUS

Arthur P. Waterson, Tulsa, Okla., assignor to Perrault Bros., Tulsa, Okla., a partnership consisting of Louis Perrault and Ainslie Perrault Application January 16, 1950, Serial No. 138,796

3 Claims. (Cl. 266—23)

This invention relates to improvements in pipe cutting machines and more particularly, but not by way of limitation, to a machine for moving a cutting torch about the periphery of a pipe, and for maintaining the cutting torch in spaced relation to the surface of the pipe.

The present invention contemplates a pipe cutting apparatus for field or shop use having a stationary adapter ring essentially channel-shaped in cross section and disposed concentrically on a pipe; and a pair of radially adjustable T-shaped feet disposed in spaced relation and carried in housings on the rear face of the adapter ring, for supporting the apparatus on the pipe. The feet are inter-connected by a system of gears to a centering indicator mechanism disposed in a housing on the rear face of the adaptor ring between the foot housings. A carrier ring is rotatably disposed in the stationary ring; and is provided with circular gear rigidly secured on the inner face of the carrier ring for engagement with a pinion gear disposed in the stationary ring and secured to a drive shaft extending axially through the stationary ring. A torch holding mechanism is secured to the outer face of the carrier ring for maintaining a cutting torch carried thereby in a spaced relation to the surface of the pipe as the ring and torch move around the pipe. A small power unit may be disposed on the rear face of the adapter ring and connected to the drive shaft to move the carrier ring and the torch assembly around the pipe, or the drive shaft may be turned manually if desired.

An important object of this invention is to provide a pipe cutting machine which may be accurately and efficiently centered on a pipe in a minimum of time.

Another object of this invention is to provide a pipe cutting apparatus which makes a smooth and truly transverse cut and compensates for all normal irregularities in the contour of the pipe.

Another object of this invention is to provide a pipe cutting machine readily adjustable to cut bevels at several different angles.

Another object of this invention is to provide a pipe cutting machine capable of being placed in operating position on a pipe when the end of the pipe is not accessible.

A still further object of this invention is to provide a portable, efficient and durable pipe cutting machine.

Other objects and advantages of the invention will be evident from the following detailed description, read in conjunction with the accompanying drawings, which illustrate my invention.

In the drawings:

Figure 6 is a side elevational view of the torch holding mechanism partially in section.

Figure 7 is a front elevational view of the torch holding mechanism with part of the adjusting elements withdrawn or disassembled for clarity.

Figure 8 is a detailed cross sectional view of a portion of the centering mechanism.

Figure 5:
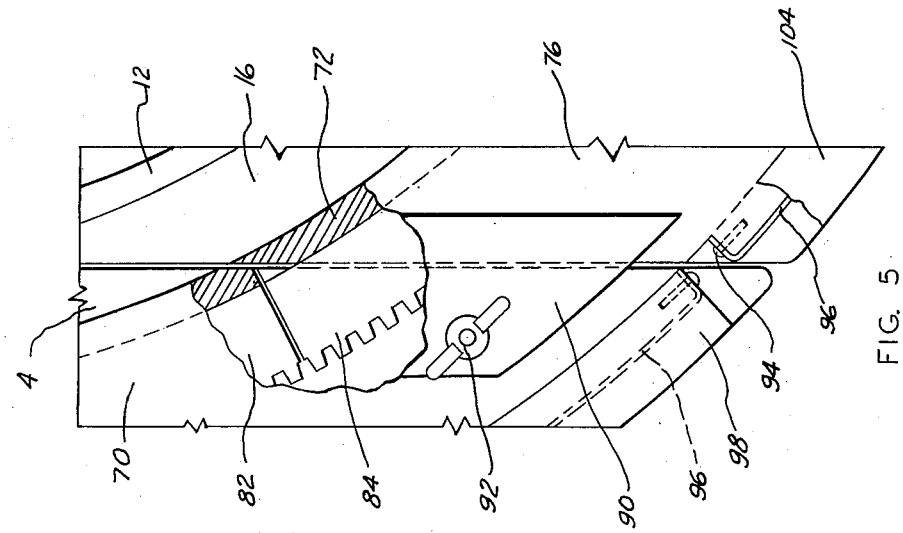
Figure 5 is a detailed view at the juncture of the removable bridging sections and the main body portion of the machine as viewed from the front of the machine in Figure 3 with the connecting plate and the carrier ring partially cut away to show the outer face of the ring gear.
Figure 4:
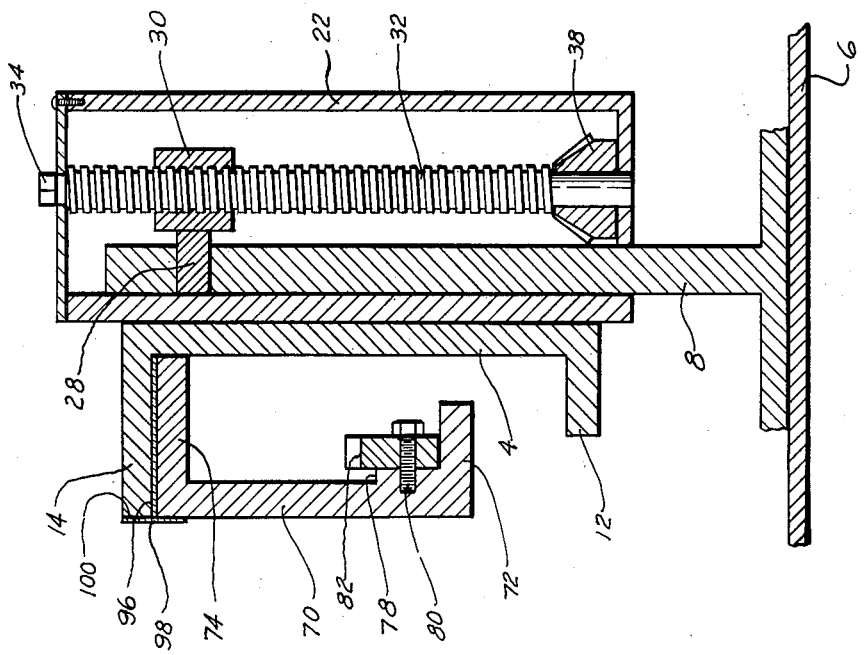
Figure 4 is a detailed sectional view taken on line A—A of Figure 2.

Referring to the drawings in detail, reference character 2 designates a pipe cutting machine generally, having a stationary substantially annular shaped adapter ring 4 supported concentrically on a pipe 6 by two angularly spaced T-shaped feet 8 and 10 extending inwardly from the ring 4. The adapter ring 4 is essentially channel shaped in cross section, having forwardly extending flanges 12 and 14 (Figures 4 and 5) adjacent the inner and outer peripheries respectively thereof. The ring 4 is slotted at 15 to provide for a removable bridging section 16 for purposes as will be hereinafter set forth. The bridging section 16 is provided with plates 18 at the opposite ends thereof adapted to be secured to the main body portion of the adapter ring 4 by stud bolts 20 or the like.

Figure 1:
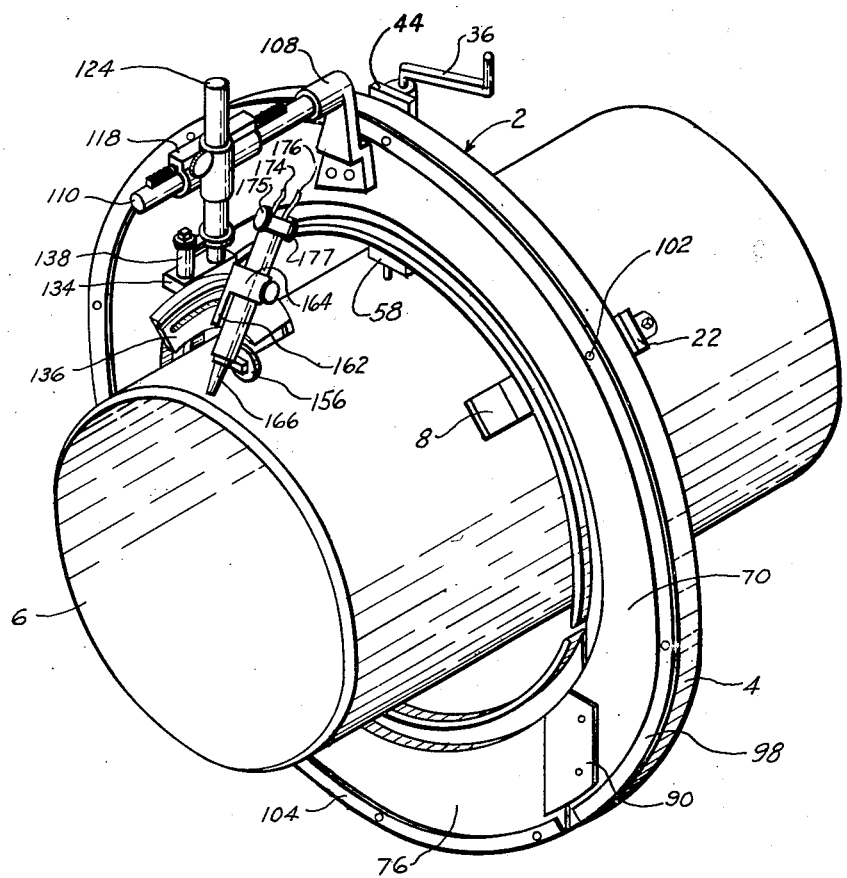
Figure 1 is a perspective view of an improved pipe cutting machine disposed on a length of pipe.

The feet 8 and 10 extend into auxiliary foot housings 22 and 24 respectively, secured in spaced relation on the rear face of the adapter ring 4 by a plurality of bolts 26. Secured to the outer end of each of the feet 8 and 10 is an axially disposed pin 28 (Figure 4) communicating at its opposite end with a threaded nut 30 disposed on a threaded stud shaft 32 rotatably supported in vertical position in each of the foot housings 22 and 24 by suitable bearings (not shown). Each of the radially disposed shafts 32 extends through the top of its respective housing, and has its outer end 34 provided with an irregular shaped contour for receiving any suitable hand crank 36 (Figure 2) for purposes as will be hereinafter set forth. Each of the radially disposed shafts 32 is also provided with a bevel gear 38 (Figure 4) on its inner end in driving engagement with a similar bevel gear 40 disposed on the outer end of each of the obliquely extending shafts 42. The shafts 42 extend from the foot housings 22 and 24 into a centrally disposed foot housing 44 secured on the rear face of the adapter ring 4 by a plurality of bolts 46 mid-way between foot housings 22 and 24. The ends of the shafts 42 disposed in housing 44 are provided with bevel gears 48 in working engagement with a similar bevel gear 50 secured on the lower end of a vertical threaded shaft 52 supported in the rear portion of the housing 44 by suitable bearings (not shown) and having its upper end 54 adapted to receive the hand crank 36. A threaded nut 56, disposed on the vertical stud shaft 52, has secured thereto an axially extending pin (not shown) communicating at its forward end with the upper end of a center foot member 58 (Figures 1 and 2) disposed in the forward portion of the housing 44. Provided in the lower end of the center foot 58 is a vertical bore 60 (see also Fig. 8) containing a spring 62 in the upper end thereof and an indicating plunger or feeler 64 which extends below the lower end of the foot 58. The spring 62 is secured at its opposite ends to the foot 58 and the plunger 64 to retain the plunger 64 in the bore 60. The plunger 64 is provided with a circumferential groove 66 approximately medially thereof visible in one position thereof through a transverse slot 67 provided in the foot 58 in communication with the vertical bore 60, for purposes as will be hereinafter set forth.

Rotatably disposed in the adapter ring 4 is an annular-shaped carrier ring 70 (Figure 4) essentially channel shaped in cross section, having circumferential flanges 72 and 74 adjacent the inner and outer peripheries respectively thereof, and having a removable or bridging section 76 similar to 16 for purposes as will be hereinafter set forth. The carrier ring 70 is also provided with a circumferential shoulder 78, adjacent the inner flange 72, adapted to receive a plurality of spaced studs 80 for retaining a ring gear 82 thereto. The ring gear 82 is also provided with a removable or bridging section 84 (Figure 3) corresponding in length to the bridging section 76 of the carrier ring 70. In driving engagement with the ring gear 82 is a pinion gear 86, secured in the adapter ring 4 by suitable bearings (not shown) and having a drive shaft 88, extending axially through the rear portion of the adapter ring 4. The drive shaft 88 may be rotated by a suitable power unit (not shown), disposed on the rear face of the adapter ring 4, or manually if desired.

The bridging section 76 of the carrier ring 70 is provided with plates 90 at the opposite ends thereof, adapted to be secured to the main body portion of the carrier ring 70 by bolts 92 for retaining the bridging section 76 of the carrier ring 70, and the bridging section 84 of the ring gear 82 in an operating position. Secured to the outer face of the carrier ring flange 74 (Figure 4) by suitable screws 94 is a bearing strip 96 constructed in two sections to conform to the main body portion of the carrier ring 70 and the bridging section 76. An annular shaped retaining plate 98 is secured on the outer end 100 of the adapter ring flange 14 by a plurality of screws 102, for retaining the carrier ring 70 in the adapter ring 4. The retaining plate has a bridging section 104, conforming to the bridging section 16 of the adapter ring 4 for purposes as will be hereinafter set forth.

Figure 3:
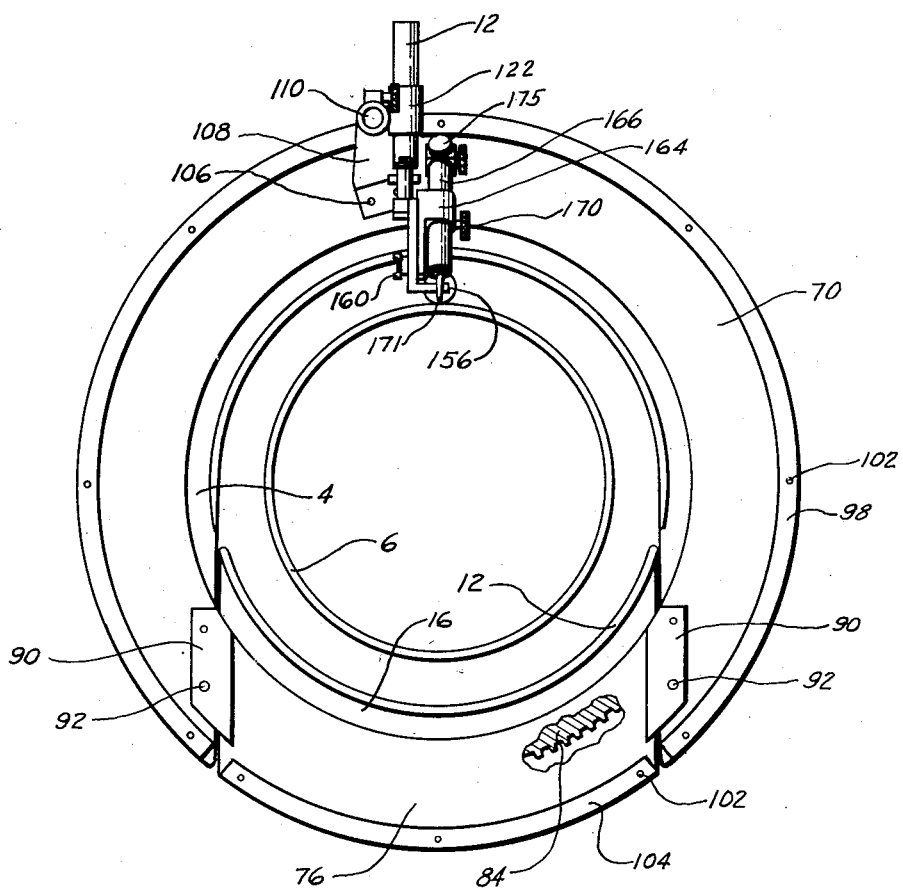
Figure 3 is front elevational view of the machine with the supporting members removed.

Secured to the outer face of the carrier ring 70 by stud bolts 106 is a bracket 108 communicating with an axially extending shaft 110, having a rack 112 on the top surface thereof (Figures 3 and 6). In working engagement with the rack 112 is a pinion 114 communicating with a knob or handle 116. The pinion 114 is rotatably disposed in a housing 118 having an axially disposed cylindrical portion 120 for receiving the rod 110, and a vertically disposed cylindrical portion 122 adapted to have a sleeve 124 secured therein, by means of a set screw 123. The sleeve 124 is provided with a vertical bore 126 containing a spring 128, and the upper portion of a rod or plunger 130. The rod 130 extends below the sleeve 124 and is secured at its lower end 132 in a bracket 134 communicating with an arcuately shaped plate 136. The bracket 134 also communicates with a vertically extending stud 138, drilled and tapped at its upper end 140 to receive a stud bolt 142 for retaining a washer 144 thereon. A vertical spline 146 is provided in the bolt 142 for receiving the outer forked end 148 of a guide member 150, secured on the lower end of the sleeve 124. Provided on the lower end of the arcuately shaped plate 136 is a pair of transverse studs 152 disposed in spaced relation, and adapted to receive an axially disposed shaft 154 for supporting a wheel 156 therebetween. The plate 136 is also provided with an arcuate slot 158 and an arcuate groove 159. A bolt 160 disposed in aperture 161 secures the torch clamp 162 to the plate 136, and the clamp is provided with a spline (not shown) cooperating with the groove 159 to properly guide the clamp relation to the plate 136.

The clamp 162 is provided with a cylindrical portion 164 for receiving a cutting torch 166 having a rack (not shown) secured on one side thereof. In working engagement with the rack on the side of the torch 166 is a pinion 168 rotatably disposed in the cylindrical portion 164 and communicating with a knob or handle 170. The arcuate slot 158 and the arcuate groove 159 are formed on the arcs of concentric circles having a common center at the lower end 171 (Figure 3) of the torch 166 for purposes as will be hereinafter set forth. The cutting torch 166 is provided with the usual acetylene and oxygen connections 174 and 176 communicating with a source of supply (not shown). Suitable adjusting knobs 175 and 177 are provided for the connections.

To prevent the beveling machine 2 from moving on the pipe 6, a chain 178 (Figure 2) is secured to a suitable bracket 180 provided on the foot housing 24 and is placed in tension around the lower portion of the pipe 6 by a load binder 182 communicating with a spring 184 anchored at one end to a bracket 186 provided on the opposite foot or clamp housing 22.

*Operation*

The beveling apparatus 2 is normally installed on a pipe 6 by threading over one end of a pipe section, frequently however, the end of the pipe is not accessible and the machine must be lowered onto the pipe. The present machine may be thus lowered onto a pipe by removing the numerous bridging sections such as section 16 of the adapter ring 4, and the bridging section 76 of the carrier ring 70. The bridging section 84 of the ring gear 82 is secured to the carrier ring bridging section 76, it consequently is removed with section 76, thereby providing an opening in the lower portion of the apparatus sufficiently large to allow the machine to be lowered onto the pipe 6. When the supporting clamps 8 and 10 contact the surface of the pipe, the bridging sections 16, 76 and 84 are replaced.

Figures 2, 9:
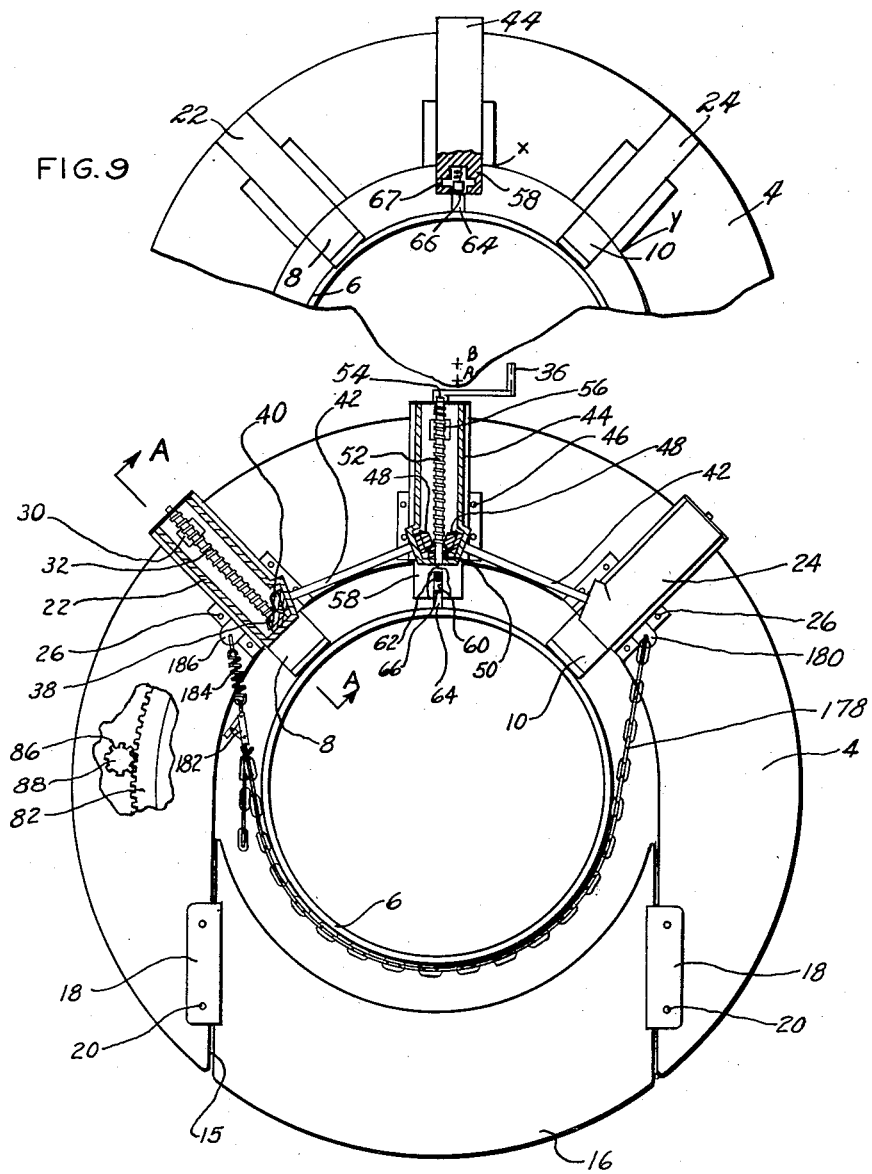
Figure 2 is a rear elevational view of the machine partially in section for clarity.
Figure 9 is a fragmentary elevational view of the pipe cutting machine illustrating the operation of centering the machine on the pipe to be cut.

In the preferred embodiment, the radially disposed shafts or screw jacks 32 are provided with right hand threads and the vertical shaft 52 of the center clamp housing is provided with left hand threads. The system of bevel gears interconnecting the shafts 32 and 52 rotate the shaft 52 in one direction when the shafts 32 are rotated in the opposite direction, therefore when the shafts 32 are rotated in a clockwise direction (referring to the outer end) the feet 8 and 10 are moved outwardly. Since shaft 52 is rotating in an opposite or counter-clockwise direction, its corresponding nut 54 and clamp 58 are also moved outwardly. It is thus readily seen that all of the clamping feet may be moved inwardly by turning one of the shafts in the opposite direction. It will also be apparent that the shafts may be threaded in a reverse manner to that described above without affecting the principle of operation. Since one side of the pipe may be more accessible to the operator than the other side, each of the shafts is adapted to be turned by the hand crank 36. The machine is centered with respect to the center line of the pipe by moving the feet 8, 10 and 58 inwardly or outwardly until the indicating groove 66 on plunger 64 is visible through the transverse slot 67 in the center foot clamp 58. For example, when the machine is placed on the pipe 6, the feet 8 and 10 may be extended too far as illustrated in Fig. 9. It will then be apparent that the center of the adapter ring 4 will be at point B, whereas the center of the pipe 6 will be at a lower position, point A. Also, the groove 66 will be below the horizontal slot 67 in the foot 58. In this position of the adapter ring 4, the distance from point A to a point Y on the adapter ring 4 adjacent the foot 10 will be less than the distance from point A to a point X on the adapter ring 4 adjacent the center foot 58. Thus, when the ring 4 is moved downwardly (by moving the feet 8 and 10 outwardly) to a concentric relation with the pipe 6, the point X on the adapter ring 4 must move a greater distance than the point Y toward point A. The center foot 58 will also be moved radially outward. However, the foot 58 will simultaneously move downward a slightly greater distance and move over the stationary indicating plunger 64 to bring the transverse slot 67 toward the indicating groove 66. Upon centering the adapter ring 4, the points X and Y will be an equal distance from the center of the pipe 6 and the indicating groove 66 will be observable through the transverse slot 67 in the center foot 58. After the apparatus has been centered, it is then secured to the pipe by placing the chain 178 in tension around the lower portion of the pipe, hooking it in the load binder 182 and locking the load binder.

The torch holding assembly allows adjustment of the cutting torch 166 in three directions, axially, radially and angularly. The axial adjustment is affected by turning the pinion knob 116 and hence pinion 114. Since pinion 114 is supported in the housing 118 and engages rack 112, rotational movement of pinion 114 moves housing 118 and torch 166 axially. The radial movement is obtained by rotating the pinion knob 170 and pinion 168. The pinion 168 is supported in the cylindrical portion 164 of torch clamp 162 and engages a rack (not shown) secured on the side of the cutting torch 166, therefore a rotational movement of pinion 168 moves torch 166 and its attached rack vertically toward or away from the pipe 6, depending upon the direction of rotation of the pinion.

The angular adjustment of the torch is obtained by loosening the bolt 160 and moving the torch clamp 162 over the face of the arcuate plate 136. This movement is constant since bolt 160 is retained in the arcuate slot 158 and the inner face of the torch clamp 162 is provided with a spline (not shown) retained in the spaced arcuate groove 159 so that the clamp 162 is constrained to move in an arcuate path. As before noted, the arcuate slot 158 and arcuate groove 159 are formed on arcs of concentric circles having a common center at the lower end 171 of the torch 166, therefore as the angular position of torch 166 is adjusted, the lower end 171 thereof is maintained in spaced relation to the outer surface of the pipe 6, thereby eliminating the necessity of subsequent axial and radial adjustments.

The angular position of the torch 166 obviously determines the angle of bevel obtained on the pipe 6 and the maximum angles of bevel which may be obtained are limited by the length of the slot 158 and groove 159 which may be extended as desired. The upper arcuate surface 188 of the plate 136 may be calibrated in degrees if desired to facilitate the angular adjustments of the torch 166.

The spring 128 disposed in the upper end of sleeve 124 continually exerts a downward force or tension on the plunger 130, thereby maintaining the roller 156 in constant contact with the outer surface of the pipe 6. Since the shaft 154 supporting the wheel 156 is in a fixed spaced relation to the cutting torch 166, the lower end 171 of the torch is maintained in a fixed spaced relation to the outer surface of the pipe 6, thereby obtaining a smooth bevel even though the pipe may be slightly out of round. It is readily seen that the radial position of sleeve 124 is determined by the size of the pipe 6 and may be adjusted by loosening the tightening screw 123.

The cutting torch 166 is prevented from turning about the sleeve 124 by the action of the forked end 148 of the guide member 150 on the vertical or radial spline 146 of the stud 138, and the torch is prevented from falling when the machine is removed from the pipe 6 by the guide member end 148 contacting the washer 144.

After the cutting torch 166 has been placed in the desired position and lighted, the machine is placed in operation by turning the drive shaft 88. The pinion gear 86 secured to the end of the drive shaft engages the ring gear 82 and moves the ring gear, carrier ring 70 and the torch assembly around the pipe.

The drive shaft 88 is preferably automatically driven by any suitable motor (not shown) having a variable speed transmission to insure accurate and constant speed of the cutting torch during its travel about the pipe.

From the foregoing, it will be apparent that the present invention provides a pipe beveling apparatus which is capable of shop or field use wherein the beveling torch is quick and positive in its action. Furthermore, the angular adjustment of the torch member on the arcuate plate does not substantially vary the vertical or axial adjustments of the torch. In addition, the clamping means for mounting the beveling apparatus on a cylindrical member, such as a pipe and the like is such that actuation of any one member will cause a simultaneous actuation of the other clamping members in their proper relationship therebetween. The synchronized centering with the indicator attachment in the center foot member provides for positive concentric setting of the machine on the pipe. The adjustability of the cutting torch provides for disposing the torch at various angles which will permit a beveled angle cut of 40° in either direction relative to opposite ends of the calibrated arcuately shaped plate. Adjustment of the torch on the arcuately shaped plate is not affected while making adjustments either axially or vertically if desired, and the flexible arrangement of the torch provides for any variance due to out of round portions of the pipe as indicated by the supporting roller.

Alluding further to the strip or race 96 between the carrier flange and the adaptor ring flange 14, it is desired that this strip 96 be made of tempered steel liner providing a hard bearing surface.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a pipe cutting apparatus comprising a stationary annular ring adapted to surround a pipe, a forwardly extending circumferential flange on the stationary ring adjacent the outer periphery thereof, a pair of housings in spaced relation on the rear face of said stationary ring, a radial threaded shaft rotatably disposed in each of said housings, clamping members extending into each of said housings and in spaced relation to said radial shafts, fastening means connecting said shafts to one end of said clamping members for moving said clamping members radially when said shafts are rotated, a housing disposed on the rear face of said stationary ring mid-way between said first mentioned housings, a vertical threaded shaft rotatably disposed in said last mentioned housing, a center foot member extending into said last mentioned housing, means connecting said vertical shaft to the upper end of said center foot member for moving said center foot member vertically when said vertical shaft is rotated, a plunger reciprocally disposed in the lower end of said center foot member, a mark on said plunger for centering the clamping members relative to the pipe, gear means interconnecting the radial shafts and vertical shaft for providing a simultaneous rotation of all of said shafts when one of said shafts is rotated, an annular carrier ring rotatably disposed in said stationary ring, and torch holding means secured to the outer face of said carrier ring.

2. In an apparatus for cutting a pipe, comprising a stationary annular ring of a size to surround the pipe, a pair of housings secured in spaced relation on one face of said ring, a threaded shaft rotatably supported in each of said housings in a direction radial to the ring, a supporting member extending into each of said housings in spaced relation to the respective shaft and adapted to contact the pipe, fastening means connecting said shafts to said supporting members for moving said supporting members radially with respect to the ring when said shafts are rotated, an auxiliary housing secured to said stationary ring between said first mentioned housings, a vertical threaded shaft rotatably secured in said auxiliary housing, a center foot member in said auxiliary housing extending toward the pipe, means connecting said vertical shaft to said center foot member for moving said center foot member vertically when said vertical shaft is rotated, gear means interconnecting said radial shafts and said vertical shaft to provide rotational movement of all of said shafts when one of said shafts is rotated, means for rotating one of said shafts, plunger means reciprocally disposed in the lower end of said center foot member and adapted to extend into contact with the pipe, an aperture provided in said center foot member, and a mark on said plunger visible through said aperture when the lower end of said plunger and the inner ends of said supporting members are an equal distance from the center line of the ring.

3. In an apparatus for cutting a pipe, comprising a stationary ring of a size to surround the pipe, a pair of housings secured in spaced relation on said stationary ring, a supporting member in each of said housings adapted to extend into contact with the pipe, a third housing secured on said stationary ring between said first mentioned housings, a center foot member extending into said third housing, a spring loaded plunger carried by said center foot member adapted to extend into contact with the pipe, an aperture in said center foot member, a mark on said plunger visible through said aperture when the outer end of said plunger and the outer ends of said supporting members are an equal distance from said ring, and means for moving said supporting members and center foot member simultaneously and uniformly toward and alternately away from said ring.

References Cited in the file of this patent

UNITED STATES PATENTS

| Number | Name | Date |
|---|---|---|
| 1,692,924 | Brown | Nov. 27, 1928 |
| 1,705,923 | Irwin et al. | Mar. 19, 1929 |
| 1,775,667 | Buckman | Sept. 16, 1930 |
| 1,885,107 | Brown | Nov. 1, 1932 |
| 1,998,729 | Mathey et al. | Apr. 23, 1935 |
| 2,086,764 | Brown | July 13, 1937 |
| 2,090,431 | Stover | Aug. 17, 1937 |
| 2,146,959 | Kugel | Feb. 14, 1939 |

FOREIGN PATENTS

| Number | Country | Date |
|---|---|---|
| 36,742 | Switzerland | Mar. 14, 1906 |
| 594,998 | Germany | Mar. 26, 1934 |